United States Patent
Egger et al.

(10) Patent No.: US 9,827,749 B2
(45) Date of Patent: Nov. 28, 2017

(54) COMPOSITE FOR PRODUCTION OF AN ACOUSTIC MEMBRANE AND ACOUSTIC MEMBRANE

(71) Applicant: tesa SE, Hamburg (DE)

(72) Inventors: Michael Egger, Hamburg (DE);
Bernhard Müssig, Seevetal (DE);
Philip Schultz, Wentorf (DE)

(73) Assignee: tesa SE, Norderstedt (DE)

( * ) Notice: Subject to any disclaimer, the term of this patent is extended or adjusted under 35 U.S.C. 154(b) by 0 days.

(21) Appl. No.: 14/784,642

(22) PCT Filed: Mar. 31, 2014

(86) PCT No.: PCT/EP2014/056471
§ 371 (c)(1),
(2) Date: Oct. 15, 2015

(87) PCT Pub. No.: WO2014/170122
PCT Pub. Date: Oct. 23, 2014

(65) Prior Publication Data
US 2016/0052246 A1      Feb. 25, 2016

(30) Foreign Application Priority Data

Apr. 16, 2013   (DE) .................. 10 2013 206 812

(51) Int. Cl.
*H04R 25/00*      (2006.01)
*B32B 27/28*      (2006.01)
(Continued)

(52) U.S. Cl.
CPC ............. *B32B 27/285* (2013.01); *B32B 7/12* (2013.01); *B32B 27/288* (2013.01);
(Continued)

(58) Field of Classification Search
CPC ........ G10K 13/00; H04R 1/22; H04R 1/2834; H04R 7/00; H04R 7/02; H04R 7/04;
(Continued)

(56) References Cited

U.S. PATENT DOCUMENTS 7,726,441 B2   6/2010   Uryu et al.
7,753,164 B2   7/2010   Nick et al.
(Continued)

FOREIGN PATENT DOCUMENTS

CN     101375631 A     2/2009
CN     102065355 A     5/2011
(Continued)

OTHER PUBLICATIONS

Plantema, F. J.; "Sandwich Construction: The Bending and Buckling of Sandwich Beams, Plates and Shells" 1966, Jon Wiley and Sons, New York.
(Continued)

*Primary Examiner* — Brian Ensey
(74) *Attorney, Agent, or Firm* — Norris McLaughlin & Marcus, P.A.

(57) ABSTRACT

The invention relates to a composite for production of an acoustic membrane, wherein the composite comprises an internal carrier layer and at least two adhesive layers on the two surfaces of the carier layer, and wherein the carrier layer is a layer of a polyaryl ether ketone film; and also to a corresponding membrane for acoustic transducers.

15 Claims, 1 Drawing Sheet

(51) Int. Cl.
*B32B 7/12* (2006.01)
*H04R 7/10* (2006.01)
*C09J 7/02* (2006.01)
*H04R 31/00* (2006.01)
*C09D 171/00* (2006.01)

(52) U.S. Cl.
CPC .......... *C09D 171/00* (2013.01); *C09J 7/0282* (2013.01); *H04R 7/10* (2013.01); *H04R 31/003* (2013.01); *B32B 2250/40* (2013.01); *B32B 2255/10* (2013.01); *B32B 2255/26* (2013.01); *B32B 2307/10* (2013.01); *B32B 2371/00* (2013.01); *C08G 2650/40* (2013.01); *C09J 2201/128* (2013.01); *C09J 2433/00* (2013.01); *C09J 2471/006* (2013.01); *H04R 2307/025* (2013.01); *H04R 2499/11* (2013.01)

(58) Field of Classification Search
CPC ... H04R 7/06; H04R 7/10; H04R 7/12; H04R 7/14; H04R 7/20; H04R 7/26; H04R 7/122; H04R 7/125; H04R 9/06; H04R 31/003; H04R 2307/025; H04R 2307/029
USPC ................. 381/423, 426, 428; 181/157, 164, 181/166–170
See application file for complete search history.

(56) References Cited

U.S. PATENT DOCUMENTS

| | | | |
|---|---|---|---|
| 8,389,672 B2* | 3/2013 | Taniguchi | C08J 5/18 428/220 |
| 8,496,086 B2 | 7/2013 | Gerkinsmeyer | |
| 2004/0112672 A1 | 6/2004 | Ono et al. | |
| 2005/0221106 A1 | 10/2005 | Nick et al. | |
| 2010/0065185 A1* | 3/2010 | Husemann | C09J 7/02 428/220 |
| 2010/0288579 A1 | 11/2010 | Gerkinsmeyer | |
| 2011/0042846 A1 | 2/2011 | Nick et al. | |
| 2011/0272208 A1* | 11/2011 | Shen | H04R 7/10 181/170 |
| 2012/0002833 A1 | 1/2012 | Metzler et al. | |
| 2014/0072163 A1 | 3/2014 | Yamada | |

FOREIGN PATENT DOCUMENTS

| | | |
|---|---|---|
| CN | 202374438 U | 8/2012 |
| CN | 202395975 U | 8/2012 |
| CN | 202918484 U | 5/2013 |
| DE | 41 40 499 A1 | 6/1993 |
| DE | 10 2006 019 219 A1 | 7/2007 |
| DE | 203 21 835 U1 | 1/2011 |
| EP | 2 172 059 A2 | 4/2010 |
| EP | 2 271 137 A1 | 1/2011 |
| EP | 2 139 965 B1 | 12/2012 |
| WO | 2010 091960 A1 | 8/2010 |
| WO | 2012 137369 A1 | 10/2012 |

OTHER PUBLICATIONS

Zenkert, D., "An introduction to Sandwich Construction", Engineering Materials Advisory Services Ltd, UK; 1995.
Chakrabarti A. et al.; "Buckling analysis of laminated sandwich beam with soft core"; Latin American Journal of Solids and Structures, 2012, 9, 367-381.
International Search Report for corresponding application PCT/EP2014/056471 dated Jun. 4, 2014.
German Search report in corresponding application DE 102013206812.3 dated Dec. 11, 2013.
English translation of First Office Action issued in corresponding Chinese Application 201480021891.7 dated Jun. 2, 2016.

* cited by examiner

COMPOSITE FOR PRODUCTION OF AN ACOUSTIC MEMBRANE AND ACOUSTIC MEMBRANE

This application is a 371 of International Patent Application No. PCT/EP2014/056471, filed Mar. 31, 2014, which claims foreign priority benefit under 35 U.S.C. §119 of the German Patent Application No. 10 2013 206 812.3, filed Apr. 16, 2013, the disclosures of which are incorporated herein by reference.

The invention relates to a layered assembly suitable for producing membranes for electroacoustic transducers, comprising a carrier layer and two damping layers disposed on the surfaces of the carrier layer.

Electroacoustic transducers, also referred to as sonic transducers, are devices which can convert electrical signals, i.e., electrical voltage, into alternating sound pressures, in other words acoustic signals, or vice versa. Examples of sonic transducers are the loudspeaker as sound generator, and the microphone, the sensor, and the pickup as sound receivers.

In cell phones, smart phones, notebooks, tablet PCs, personal digital assistants (PDAs) and headphones, the generation of sound, viz the transmission of speech, ringtones, music, and other sounds and noises, takes place via what are called micro-loudspeakers. This term refers to loudspeakers which have small dimensions mirroring the small dimensions of the devices in which they are installed. The acoustic signals here are generated by the movement of a loudspeaker membrane, which is driven mechanically by a voice coil, for example. The requirements, particularly with regard to the attainable volume of these micro-loudspeakers, are becoming increasingly more demanding. As a result of the increasing output and the associated higher temperature loading, the requirements on the thermal stability of the membranes of these micro-loudspeakers and their functional capacity under thermal load are also more exacting, causing conventional membrane materials such as polyethyleneterephthalate (PET) or polycarbonate (PC) to be at their limits ever more often.

The essential requirements for the material of a loudspeaker membrane include high flexural stiffness, low density, and high internal damping.

In order to satisfy these requirements to the maximum, multilayer laminates are increasingly being used as loudspeaker membranes. Multilayer laminates of this kind combine stiff polymeric films with soft, acoustically damping layers lying between these films. The acoustic damping properties here are closely associated with the mechanical damping properties of these layers.

Since the membranes in operation at high output undergo severe heating and in view of their small dimensions, especially in micro-loudspeakers—for instance up to loudspeaker sizes of 50 mm×30 mm×10 mm; typical micro-loudspeaker sizes in the market are, for example, 5 mm×10 mm×2 mm and 8 mm×12 mm×2 mm —may reach temperatures of 100° C. or more, the outer films used must have not only a high stiffness but also, in addition, good temperature stability as well. Having emerged in recent years as being a very highly suitable material for the outer films is the high-performance polymer polyetheretherketone (PEEK), which is frequently used in multilayer laminates with additional soft damping layers.

Starting from the abovementioned three-layer laminates, with five-layer laminates the internal, damping layer is interrupted by a further, inner layer. In accordance with the "sandwich theory", the multilayer laminates follow the principle that a high flexural stiffness in multi-ply or sandwich membranes is achieved by using the stiffest layers on the outside, enclosing softer interior layers. Accordingly, the stiff PEEK films are always used as outside layers, and the inside layers proposed in the prior art are significantly softer.

EP 2 172 059 A describes, accordingly, a five-ply laminate, consisting of two outer PEEK films, applied with a respective layer of a thermoplastically deformable adhesive to both sides of a nonwoven web. In this laminate, the two outer PEEK films take on the function of giving the laminate high flexural stiffness, while the internal soft plies (adhesives, nonwoven web) ensure effective internal damping of the assembly.

Another five-ply laminate is described by US 2011/0272208 A. This laminate is constructed from two outer film layers (cited as material for the outer films is PEEK as well as a number of other plastics), which are applied using an acrylic adhesive to the two sides of a PET film. According to this specification, this multi-ply construction allows the membrane to reach a longer lifetime than a three-ply laminate comprising two outer film layers, such as polyarylate films (PAR films), for example, and a damping layer of adhesive lying between these films.

On account of the low glass transition temperature of polyethylene terephthalate (approximately 70° C. in DSC at a heating rate of 10 K/min), the heating-up of this material is accompanied by a sharp drop in stiffness, which is associated with the increasing softening of the material and is manifested in a marked drop in the elasticity modulus (the stiffness of the film materials used for loudspeaker membranes is described by a parameter known as elasticity modulus, also called E modulus or tensile modulus, or Young's modulus, which is defined by the ratio of strain to elongation in the deformation of the material in the linear-elastic range). As mentioned above, however, acoustic membranes heat up sharply in use, meaning that the PET film in an application scenario likewise constitutes a soft inside layer, and, even after the introduction of a polymeric film as middle layer into the production construction, there is no breaking of the above-mentioned sandwich theory, whereby the stabilizing layers are to be on the outside and the damping layers on the inside. Accordingly, the disclosure content of this specification is also confined to PET as material for this inner film layer. Details of the specific design of the membrane are not disclosed in the specification.

The product constructions in which PEEK is used in the outer layers on account of the good properties in respect of its flexural stiffness are relatively costly, for reasons including the use of two outer PEEK films. Moreover, all of the other outwardly directed properties of these membranes are also determined by PEEK as the outer material.

It is seen as an object of the invention to find alternative product constructions which in particular can advantageously be produced more cost-effectively, but while retaining their good properties in respect of high flexural stiffness, low density, and high internal damping and preferably permitting ready adaptation of the properties to the particular end use.

Surprisingly it has been possible to achieve this object by using a PEEK film as stabilizing film as the inside carrier layer of a membrane which can be utilized in particular for use for electroacoustic transducers. It has emerged that the use of only one PEEK film as a central middle layer is enough in itself to provide a multilayer laminate overall not only with high flexural stiffness but also with sufficient stability, ensuring a long lifetime of the membrane in the application. The damping properties are brought about in particular by layers arranged on the surfaces of the membrane, preferably by layers of adhesive, and very preferably by layers of self-adhesive (also referred to as layers of pressure-sensitive adhesive). By this means, moreover, it becomes possible to offer a three-layer assembly as a building block for the individual fabrication of a five-layer or multilayer laminate membrane.

BRIEF DESCRIPTION OF THE DRAWINGS

The invention will now be described in greater detail with reference to the drawings, wherein.

Figure 2:
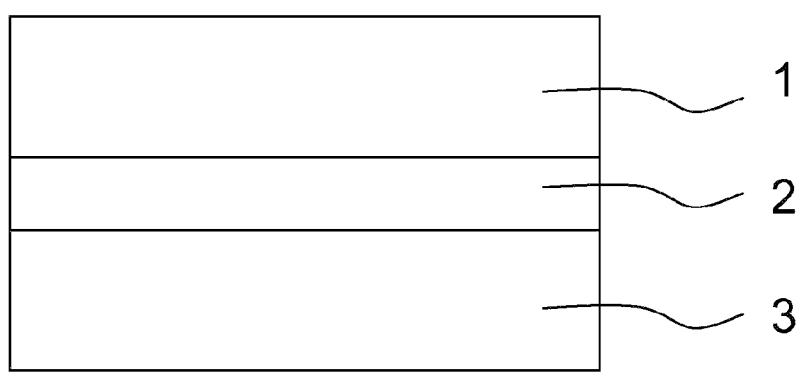
FIG. 2 shows an assembly composed of in particular a thin PEEK film, equipped on both sides with a layer of adhesive.

The invention therefore relates to a three-layer assembly—see FIG. 2—composed of an inner film layer (2) and two damping layers (1, 3) disposed on the surfaces of this film layer, preferably at least one of these damping layers being a layer of adhesive, and more preferably both damping layers being layers of adhesive, where the inner film layer (2) is a layer of a polyaryletherketone (PAEK), more particularly of polyetheretherketone (PEEK).

Figure 3:
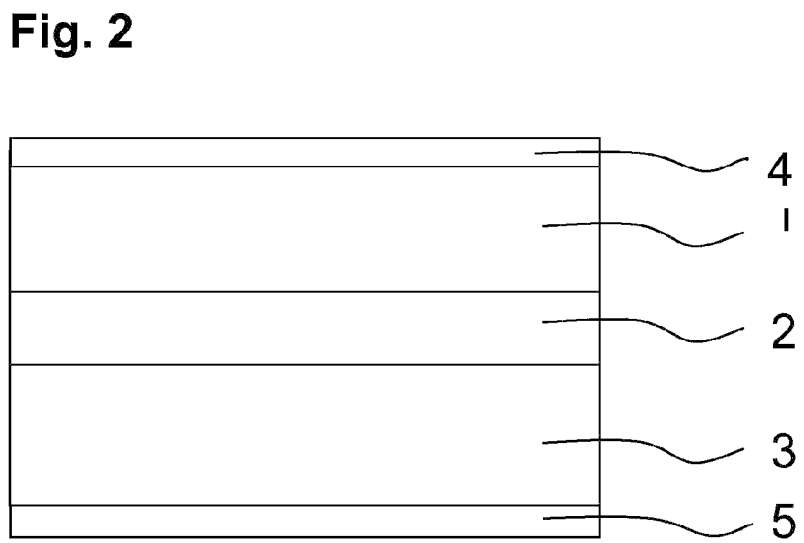
FIG. 3 shows an at least five-layer laminate.

A three-layer assembly of this kind, particularly with layers of adhesive—more preferably layers of self-adhesive—as damping layers, can be used outstandingly for producing a five-layer assembly for further utilization or production of a membrane for use for electroacoustic transducers, for example of loudspeakers, such as micro-loudspeakers, particularly by the disposal on the two outer surfaces (1, 3) of adhesive of further film layers (4, 5) and, accordingly, production of an at least five-layer laminate—see FIG. 3.

The assembly of the invention is especially suitable outstandingly for use for membranes for micro-loudspeakers having sizes of 50 mm×30 mm or less, including, in particular, for very small micro-loudspeakers with a maximum extent (that is, the length in the direction of their greatest extent) not exceeding 25 mm, more particularly not exceeding 15 mm.

In terms of their two-dimensional extent, micro-loudspeaker membranes may be, for example, round, oval, quadrilateral, square, or else different in shape.

An externally nontacky three-layer assembly may be used outstandingly, even without further outside layers, for further utilization or production of a membrane for use for electroacoustic transducers.

Four-layer laminates as well can be produced and used for further utilization or production of a membrane for use for electroacoustic transducers; in particular from three-layer assemblies where one of the damping layers is a layer of adhesive, more preferably a layer of self-adhesive.

The construction according to the invention has provided liberation from the sandwich theory teaching that the flexural stiffness of the product as a whole is assured by the outer layers. Surprisingly, for the product design according to the invention, the assumption that a very stiff middle layer would be detrimental to the damping properties of the product as a whole was not confirmed either.

Figure 1:
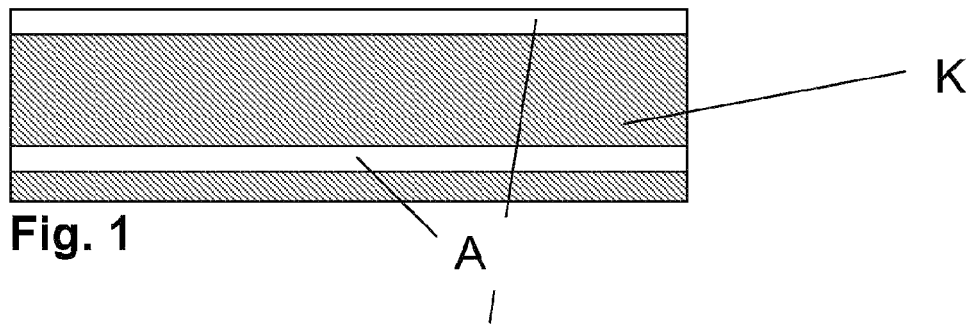
FIG. 1 shows a three-layer laminate conforming to the sandwich theory, with a damping inside layer K and two outer stiff layers A.)

This was unforeseeable given that the sandwich theory dictates the achievement of a high flexural stiffness of multi-ply or sandwich membranes specifically by using the stiffest layers on the outside, enclosing softer inside layers (see above; cf. also Plantema, F. J. 1966, Sandwich Construction: The Bending and Buckling of Sandwich Beams, Plates and Shells, Jon Wiley and Sons, New York; Zenkert, D., 1995, An introduction to Sandwich Construction, Engineering Materials Advisory Services Ltd, UK; Latin American Journal of Solids and Structures, 2012, 9, 367-381. FIG. 1 shows a three-layer laminate conforming to the sandwich theory, with a damping inside layer K and two outer stiff layers A.). As set out above, the prior-art membranes based on five-layer laminates also follow this teaching, since the layers that are on the inside in each case are formed either of permanently soft materials (such as nonwoven webs) or of materials which are soft at least in use (such as PET). Building on this theory, the skilled person would not have used, for the inside carrier layer, any materials that are "hard" even at elevated temperatures, particularly those composed of polyaryletherketones such as PEEK. The glass transition temperature of PEEK at 144° C. (DSC, heating rate 10 K/min) is significantly higher than that of the PET film proposed in US 2011/0272208. In contrast to PET, therefore, significant softening of the PEEK film occurs only at temperatures well above those occurring for the membrane in the course of its service.

The three-layer assembly composed of a central polyaryletherketone film layer (more particularly PEEK film layer) and two layers of adhesive, more particularly layers of self-adhesive, disposed on the two surfaces of this PAEK film layer, constitutes a double-sidedly adhesive tape, more particularly a self-adhesive tape. Adhesives as damping layer(s) afford the advantage that especially in the case of self-adhesive properties, on the one hand they can inherently be anchored outstandingly on the carrier layer and, on the other hand, they have the required acoustic damping properties. It has been found that the good damping properties of the system as a whole are not significantly impaired even when the damping layer is interrupted by an inserted interlayer composed of a relatively stiff film material—in this case, the PAEK or PEEK carrier layer.

When a layered assembly is employed as a membrane for acoustic transducers, however, an outwardly directed (pressure-sensitive) tack is unwanted, since it would lead to poor handling of the membrane and also to soiling thereof (as a result of copious dust attachment, for example). This would also adversely affect the properties required for the acoustics. Preferably, therefore, at least one, and preferably both of the outer layers of adhesive is or are provided with a temporary (i.e., redetachable) or permanent covering, resulting in a four-layer or, in particular, five-layer laminate.

With regard to the handling of the three-layer assembly, particularly if it is to be sold as a standalone building block to customers who use it in turn to produce their desired membrane, it is an advantage if one or both of the surfaces of adhesive is or are equipped with a temporary covering, more particularly a liner—for example, release paper, release film, or polymeric films or paper films coated with release material, such as silicone—constituting in particular a protection for the layer of adhesive, but easily removable. By this means, the consumer is enabled to make a free selection in principle of the films that are ultimately on the outside and to adapt them to the desired end-use application or loudspeaker model for the use of the product as an acoustic membrane. The required flexural stiffness, the stability of the membrane that is ultimately present, and the damping properties are fulfilled outstandingly by the described three-layer system on its own, and so the outer films can be selected optimally in line with particularly desired further product properties, such as temperature stability or cost aspects, for example.

A five-layer laminate, especially for the production of membranes for electroacoustic transducers, can be obtained by disposing, on both outside layers of adhesive, permanent covering layers, more particularly film layers, which may be selected identically or differently on both sides. In one embodiment of the invention, these permanent layers are applied after the temporary coverings have been removed.

Membranes for electroacoustic transducers, more particularly loudspeaker membranes, are frequently produced by embossing or thermoforming of a multilayer laminate, thereby bringing this laminate into a specific three-dimensional shape. For this purpose, for example, the multilayer laminate is cut to the desired dimensions and then placed onto a thermoforming mold. The laminate is subsequently heated in the mould and pressed into the shape of the completed membrane by application of pressure and/or vacuum.

Since it has now emerged that the use of just one central PAEK layer, preferably PEEK layer, is sufficient of itself to provide the laminate with sufficiently high stiffness, a multiplicity of different materials, including those having relatively low stiffnesses, can be used as outside layers in the assembly. An advantage of this is that on the one hand the acoustic properties of the membrane can be set very variably, and at the same time one of the two very expensive outer films can be replaced by more inexpensive films, thereby lowering the costs of the laminate as a whole.

On account of the high stiffness of PAEK films—such as the PEEK film—even at relatively high temperatures, it is possible to use very thin films as carrier films and nevertheless to ensure sufficient stability on the part of the assembly. For the use of in particular a thin PEEK film, coated with adhesive on either side, therefore, it is possible, by laminative application of different layers, to produce a multiplicity of different multilayer laminates with tailored acoustic properties in a simple way, conveniently. In such assemblies, the PAEK film (more particularly PEEK film) ensures high stiffness of the laminate, while the two layers of adhesive on either side of the film ensure the simultaneously necessary high internal damping of the laminate.

In one preferred embodiment, the PAEK film functioning as carrier layer has a thickness of 1 to 50 μm, more preferably of 1 to 30 μm, very preferably of 2 to 25 μm; and/or, advantageously, the layers of adhesive independently of one another each have a thickness in the range from 1 to 100 μm, preferably in the range from 1 to 50 μm, more preferably in the range from 2 to 40 μm. Although the thicknesses of the layers of adhesive can be selected independently of one another, three-layer laminates in which the thicknesses of the two layers of adhesive are selected from the same range of those specified above, more particularly symmetrical adhesive tapes, have emerged as being particularly suitable for application and for production of five-layer laminates for acoustic membranes.

A further subject of the present invention, accordingly and in particular, is an assembly composed of in particular a thin PEEK film, equipped on both sides with a layer of adhesive (cf. FIG. 2), wherein the thickness of the central PEEK film (2) is 1-50 μm, preferably 1-30 μm, more preferably 2-25 μm and the thicknesses of the layers (1) and (3) of adhesive independently of one another are 1-100 μm, preferably 1-50 μm, more preferably 2-40 μm.

The adhesives on either side of the central PAEK film, more particularly PEEK film, are preferably self-adhesives.

Self-adhesives, synonymous with pressure-sensitive adhesives (PSAs), are in particular those polymeric compositions which are durably tacky and permanently adhesive at the service temperature (unless defined otherwise, at room temperature), optionally by appropriate additization with further components, such as tackifying resins, for example, and which adhere to a multiplicity of surfaces on contact, more particularly immediately (exhibiting what is called "tack"). They are capable, even at the service temperature without activation by solvent or by heat, although customarily under the influence of a greater or lesser pressure, of wetting a target substrate sufficiently to allow interactions sufficient for adhesion to develop between the composition and the substrate. Parameters influencing this process include the pressure and the contact time. The particular properties of the pressure-sensitive adhesives originate in particular, among other factors, from their viscoelastic properties.

Acrylate PSAs are used advantageously for the layers of adhesive. These acrylate PSAs are adhesives whose polymer basis comprises polymers formed from acrylic monomers—understood in particular to encompass acrylic and methacrylic acid, the esters of the aforesaid acids, and the copolymerizable further derivatives of the aforesaid acids—, with the acrylic monomers—optionally together with further comonomers—being used in the polymerization at least in an amount such that the properties of the adhesive are critically determined by them. Accordingly, for example, PSAs with an acrylic monomer fraction in the polymerization of at least 50 wt. %, of at least 80 wt. %, or of 100 wt. % (straight acrylate systems) can be used.

Other adhesives familiar to a skilled person are likewise possible and can be used for the purposes of the invention. The adhesives on either side may be identical or may differ from one another.

For the production of membranes from multilayer laminates based on the double-sidedly adhesive PAEK film (more particularly PEEK film) it is possible, for example, to employ a method in which other high-temperature-stable polymeric films are laminated to both sides—that is to the respective surfaces of adhesive. Film materials suitable for this purpose, among others, include, for example, polyarylate (PAR), polyetherimides (PEI), polyarylsulfones, such as polyphenylenesulfone (PPSU), for example, and polyethersulfone (PES). Also possible, for example, as film materials for one or both outside films are polyphenylenesulfide (PPS), polyethylene naphthalate (PEN), polybutylene terephthalate (PBT), polyimide (PI), and polysulfones (PSU). In principle it is of course also possible to select polyaryletherketones, such as PEEK, as one or for both of the external film layers. It is possible, moreover, to use the claimed product to produce multilayer laminates, by covering the two layers of adhesive of the inside three-layer assembly with varnishes, nonwoven webs or woven fabrics on the outer sides.

The outer film layers can advantageously be selected independently of one another in thicknesses of 1 to 50 μm, more preferably of 1 to 30 μm, very preferably of 2 to 25 μm, and for producing a symmetrically constructed membrane, they may also in particular, be identical.

An example of a three-layer assembly of the invention was obtained by coating a PEEK film 6 μm in thickness (trade name Aptiv 2000-006G from Victrex), both sides of the film having been coated with an acrylate PSA 12 μm thick. This assembly was subsequently laminated on both sides with a 6 μm thick PAR film in each case (Aryphan N681 EM from Lofo).

This laminate was brought into membrane form (rectangular, 17 mm×13 mm, pre-embossing thicknesses 42 µm) by means of a customary embossing operation, and a micro-loudspeaker was fabricated from this embossed laminate according to a usual mode of production. Relative to a micro-loudspeaker of identical production with a commercial PAR-acrylate layer-PAR three-layer membrane (comparative membrane 1), the micro-loudspeaker had no disadvantages in its acoustic properties in a service test, but exhibited a longer life than the comparative membrane 1. As compared with a micro-loudspeaker produced using a membrane according to US 2011/0272208 A (with outer PEEK films; thickness of inside PET layer 6 µm, thickness of PSA layers in each case 12 µm of an acrylate adhesive, selected identically to the inventively investigated membrane in order to produce the comparative membrane, outer PEEK films 6 µm in each case; comparative membrane 2), a customer service test found a more uniform frequency response characteristic and also a lower harmonic distortion factor; the membrane, furthermore, was less expensive to produce.

The invention claimed is:

1. An assembly for producing an acoustic membrane, the assembly comprising (A) an inner carrier layer having two opposing surfaces, (B) at least one layer of adhesive on each of the two surfaces of the carrier layer and (C) a further polymeric film disposed on an outer surface of at least one of the layers of adhesive, wherein the carrier layer is a layer of a polyaryletherketone (PAEK) film, wherein said layer of a PAEK film is the only layer of a PAEK film in the assembly, and wherein an acoustic membrane produced from said assembly exhibits a more uniform frequency response characteristic and a lower harmonic distortion factor than an acoustic membrane produced from a comparison assembly that has an inner carrier layer of polyethylene terephthalate (PET).

2. The assembly of claim 1, wherein the polyaryletherketone film is a polyetheretherketone film.
3. The assembly of claim 1, wherein the adhesive of at least one layer of adhesive is a self-adhesive.
4. The assembly of claim 1, wherein both layers of adhesive are layers of self-adhesive.
5. The assembly of claim 1, wherein the adhesive of at least one layer of adhesive is an acrylate adhesive.
6. The assembly of claim 1, wherein
the inner PAEK film layer has a thickness of 1 to 50 µm and/or
the layers of adhesive independently of one another each have a thickness of 1 to 100 µm.
7. The assembly of claim 1, wherein a liner is disposed on an outer surface of at least one of the layers of adhesive.
8. The assembly of claim 1, wherein each further polymeric film has a thickness of 1 to 50 µm.
9. The assembly of claim 1, which is symmetrical in terms of layer thicknesses and/or layer composition.
10. A membrane for electroacoustic transducers obtainable by embossing or thermoforming an assembly of claim 1.
11. Loudspeakers comprising electroacoustic transducers comprising a membrane of claim 10.
12. The assembly of claim 1, wherein the further polymeric film is selected from the group consisting of polyethylene naphthalate (PEN), polyarylate (PAR), polyetherimides (PEI), polyarylsulfones (PAS), and polyethersulfones (PES).
13. The assembly of claim 12, which has the layer structure PAR-acrylate layer-PEEK-acrylate layer-PAR.
14. A membrane for electroacoustic transducers obtainable by embossing or thermoforming an assembly of claim 13.
15. Loudspeakers comprising electroacoustic transducers comprising a membrane of claim 14.

* * * * *